United States Patent [19]
San Miguel

[11] 4,041,869
[45] Aug. 16, 1977

[54] COOK-OFF LINER COMPONENT
[75] Inventor: Anthony San Miguel, Ridgecrest, Calif.
[73] Assignee: The United States of America as represented by the Secretary of the Navy, Washington, D.C.
[21] Appl. No.: 705,734
[22] Filed: July 15, 1976
[51] Int. Cl.$^2$ .................. F42B 13/00; F42B 25/20
[52] U.S. Cl. ................................. 102/56 R; 102/105
[58] Field of Search .................. 102/56 R, 105, 103
[56] References Cited
U.S. PATENT DOCUMENTS

| | | | |
|---|---|---|---|
| 3,440,820 | 4/1969 | Caveny | 102/105 |
| 3,749,024 | 7/1973 | Pakulak, Jr. | 102/56 R |
| 3,992,997 | 11/1976 | McCubbin et al. | 102/56 R |
| 4,001,126 | 1/1977 | Marion et al. | 102/105 |
| 4,004,516 | 1/1977 | Johnson et al. | 102/56 R |
| 4,010,690 | 3/1977 | Cocozella et al. | 102/105 |
| 4,011,818 | 3/1977 | Stosz, Jr. et al. | 102/56 R |

Primary Examiner—Charles T. Jordan
Attorney, Agent, or Firm—R. S. Sciascia; Roy Miller; Thomas W. Hennen

[57] ABSTRACT

A layer of high temperature resistant polymer material such as polysulfone or polyimide is bonded between the liner and energetic material in a solid fuel rocket motor, warhead, or other ordnance item. This layer prevents or delays ignition of the energetic material when the ordnance item is exposed to a high temperature environment. The layer does this by forming an impervious barrier between oxygen trapped or chemically contained within the energetic material, and gaseous fuel resulting from chemical degradation of the liner. Combustion of this gaseous fuel and resulting ignition of the energetic material is thus avoided or delayed.

10 Claims, 3 Drawing Figures

COOK-OFF LINER COMPONENT

BACKGROUND OF THE INVENTION

1. Field of the Invention

This invention pertains to linings for use in ordnance items, and more particularly pertains to such linings which improve the ability of an ordnance item to survice prolonged exposure to a high temperature environment.

2. Description of the Prior Art

Structures which contain heat sensitive energetic materials, such as rocket motor combustion chamber casings which enclose propellant grains, or warhead casings which enclose explosive material, will explode when exposed to a fire or other high temperature environment because of ignition of the energetic material and resultant catastrophic thermal stress and internal pressure buildup. Military test procedures and requirements for the heat resisting capability of ordnance items are described in Mil-Std-1648, a military specification of the United States Government which is unclassified and available to the public. One place where the problem of ordnance exposure to fire is especially serious is on the flight deck of an aircraft carrier where a large quantity of explosive ordnance may be temporarily stored or attached to aircraft during flight operations. In such situations it is possible for an aircraft fuel tank to rupture and cause a fuel fire on the carrier flight deck. This fire will engulf ordnance loaded on aircraft or stored nearby, and will eventually cause that ordnance to explode with devastating effect upon surrounding equipment and personnel.

Past attempts to solve this problem have included placing a thermal barrier on the exterior of the rocket motor casing or warhead in an attempt to thermally insulate the rocket motor propellant or explosive material from the fire. This approach attempts to increase the length of time the ordnance item may be exposed to a fire without exploding, by keeping the internal temperature low. If the fire is not extinguished within a short period of time, the ordnance item ignites and explodes. Such thermal insulating coatings are not efficient because they add nonfunctional weight to the rocket or warhead as well as increase the cost and field handling problems associated with that ordnance item. Also, aerodynamic drag is increased.

Pressurization liners have also been used with varing degrees of success. Such liners are designed to degrade into a gas at low temperature to supply controlled internal pressure for causing rupture of preweakened venting structure in the casing wall. The main problem encountered with pressurization liners is that if the liner degrades and pressurizes too suddenly, the propellant grain may crack and explode anyway. Most liners used, whether for pressurization or other purposes, will degrade at a relatively low temperature.

Intumescent coatings have also been used with varying degrees of success. The main drawback to using an intumescent coating is that the coating is applied to the exterior of the item and must be protected from scratches and abrasion. When exposed to a fire, the intumescent coating forms a very weak structural insulating layer which may easily be swept away if, for example, a stream of water is directed upon it. The ordnance item is then directly exposed to the fire.

SUMMARY OF THE INVENTION

These problems have been overcome by the present invention in which a thin layer of polymer material which is resistant to chemical degradation at high temperatures is placed between the propellant grain and liner in a solid fuel rocket motor casing. Equivalent structure is used in other ordnance items. This high temperature resistant polymer layer forms a barrier between oxidizer contained within the propellant grain and hot gaseous fuel resulting from chemical degradation of the liner when the rocket motor is exposed to a high temperature environment. The high temperature resistant polymer layer is manufactured from a material such as polysulfone or polyimide, neither of which exhibit chemical degradation at moderately high temperatures above the autoignition temperature of the propellant. By preventing contact between gaseous fuel and oxidizer, combustion of the gaseous fuel is prevented, and this in turn delays ignition of the propellant grain until it reaches its autoignition temperature.

When the rocket motor or other ordnance item is attached to the underside of an aircraft wing, the portion most vulnerable to a deck fuel fire is the lowest side, the least vulnerable portion is the highest side. Therefore, the high temperature resistant polymer layer of this invention may be discontinuous along the side of the ordnance item which is uppermost when suspended under the wing of an aircraft. Such discontinuities may allow for expansion of the propellant grain, or permit cracking of the propellant grain at a controlled point.

BRIEF DESCRIPTION OF THE DRAWINGS

Further advantages of the present invention will emerge from a description which follows of a possible embodiment of a cook-off liner component according to the invention, given with reference to the accompanying drawing figures, in which.

DESCRIPTION OF THE PREFERRED EMBODIMENT

Figure 1:
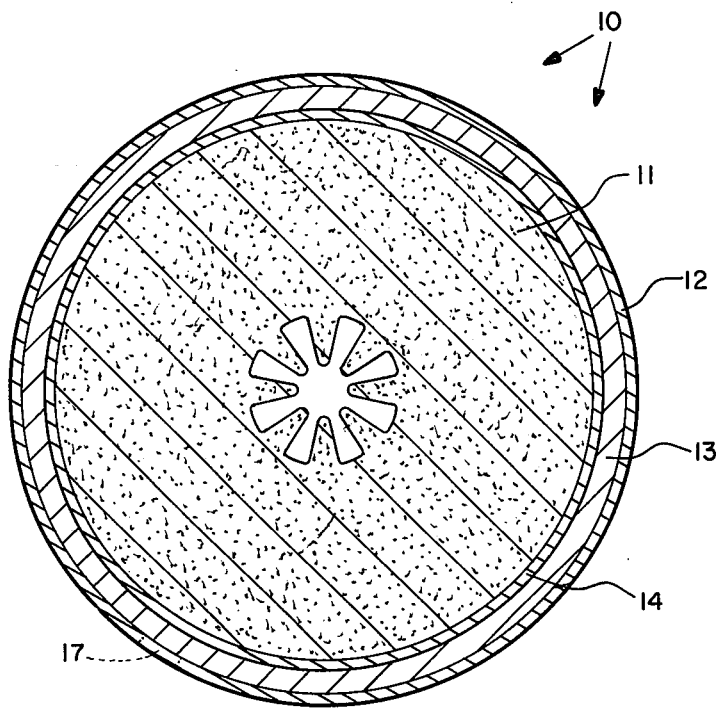
FIG. 1 is a cross-section of a rocket motor combustion chamber according to the invention.

Referring now to the drawing figures wherein like reference numerals correspond to like parts and elements throughout the several Figures, there is shown in FIG. 1 rocket motor 10 having rocket motor casing 12, casing liner 13, cook-off liner 14, and solid fuel propellant grain 11, which is an energetic material.

Cook-off liner 14 is fabricated from a high temperature resistant polymer material such as polysulfone, polyimide, or the like which does not chemically degrade at temperatures below about 700° F. Casing liner 13 is commonly made from a polymer or other material which chemically degrades at relatively low temperatures on the order of 200° F. Casing liner 13 normally protects rocket motor casing 12 from burnthrough when propellant grain 11 ignites in areas such as the sides and forward end where combustion would eventually interfere with proper rocket motor operation. Casing liner 13 also bonds propellant grain 11 to casing 12, isolates grain 11 from vibration and thermal stresses, and may also supply controlled internal pressure to force open venting structure 17 in casing 12 if exposed to a fire.

If rocket motor 10 is exposed to a high temperature environment such as a fuel fire on the deck of an aircraft carrier, heat entering through rocket motor casing 12 will rapidly heat casing liner 13 to its chemical degradation temperature and begin to transform it into flammable gaseous fuel. Oxidizer, either chemically contained within propellant grain 11 or incidentally included during manufacture, would otherwise mix with gaseous flammable fuel from casing liner 13 and create localized hot spots of combustion which would eventually ignite propellant grain 11. Ignition of propellant grain 11 at other than predetermined locations will cause cracking and eventual catastrophic destruction of rocket motor 10. Cook-off liner 14 prevents or delays this occurrence by forming an impenetrable barrier between flammable gaseous fuel created by chemical degradation of casing liner 13, and oxidizer contained within propellant grain 11.

Since propellant grain 11 is now protected against ignition caused by combustion of gaseous fuel from the degrading casing liner 13, the autoignition temperature of propellant grain 11, on the order of 450° F, must be reached before propellant grain 11 will ignite. This means that the ordnance item may now survive much longer exposure times in a high temperature environment. This also means that the gaseous product of casing liner 13 degradation has a much longer time period in which to force open casing vent structure 17 in casing 12, if the ordnance item is so equipped. Once these vents are forced open, the propellant may ignite and burn harmlessly until fully consumed without presenting an explosion hazard to equipment and personnel. Of course, the invention is equally useful in ordnance items which do not have casing vents. Cook-off liner 14 also provides some thermal insulation to reduce heat flux into rocket motor 10 which further extends the length of exposure time that can be tolerated. Any material which is both compatible with and has a similar thermal coefficient of expansion as propellant grain 11 and casing liner 13 may be used for cook-off liner 14, provided that the material selected has a significantly higher temperature resisting capability than does casing liner 13, and that the chemical degradation temperature of liner 14 material exceeds the autoignition temperature of propellant grain 11.

Figure 2:
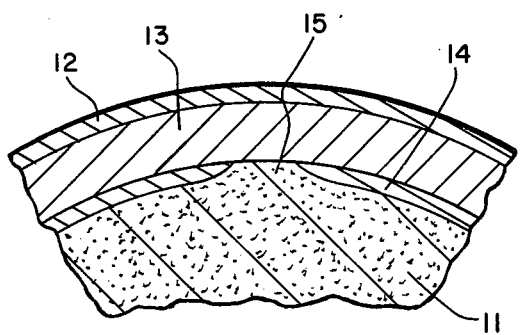
FIG. 2 is a fragmentary section of a rocket motor combustion chamber according to the invention.

Referring now to FIG. 2 there is additionally shown a zone of cook-off liner discontinuity 15. This zone 15 is located at the top of rocket motor 10 when rocket motor 10 is suspended under the wing of an aircraft. Zone 15 provides room for thermal expansion of propellant grain 11 or cook-off liner 14 without significantly reducing the protection of rocket motor 10. This is because the top of rocket motor 10 is the least vulnerable point on the rocket motor to propellant grain 11 ignition when exposed to a high temperature fuel fire environment.

Figure 3:
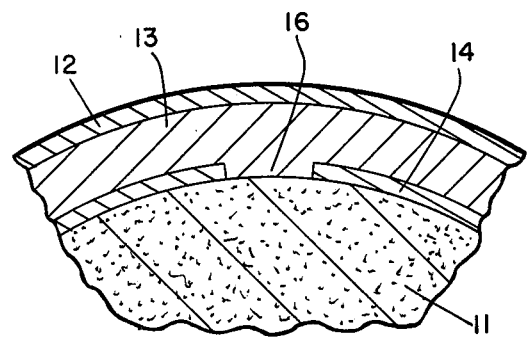
FIG. 3 is a fragmentary section of a rocket motor combustion chamber according to the invention.

FIG. 3 shows an alternate liner configuration wherein casing liner 13 is thickened to fill the void at discontinuity 16 between adjacent ends of cook-off liner 14.

The invention has been described in an illustrative manner and it is to be understood that the terminology which has been used is intended to be in the nature of words of description rather than of limitation. Obviously, many modifications and variations of the present invention are possible in the light of the above teachings. It is therefore to be understood that within the scope of the appended claims the invention may be practiced otherwise than as specifically described.

What is claimed is:

1. An ordnance item which exhibits an increased ability to survive exposure to a high temperature environment, said item comprising:
   a casing for containing an energetic material;
   energetic material including an oxidizer contained within said casing;
   a first liner forming a continuous layer between said casing and said energetic material; and
   a second liner forming a layer between said first liner and said energetic material;
   said first liner being made from a first material which chemically degrades at a predetermined temperature to form a gaseous fuel, and said second liner being made from a second material which remains intact at said predetermined temperature and which second material is impervious to penetration by said gaseous fuel and said oxidizer;
   for preventing combustion of said gaseous fuel and resultant ignition of said energetic material when said ordnance item is exposed to said high temperature environment.

2. The ordnance item of claim 1 wherein said second liner forms a continuous layer between said first liner and said energetic material.

3. The ordnance item of claim 1 wherein said second liner defines at least one zone of direct contact between said first liner and said energetic material.

4. The ordnance item of claim 1 wherein said second liner is made from polysulfone.

5. The ordnance item of claim 1 wherein said second liner is made from polyimide.

6. The ordnance item of claim 1 wherein said casing defines a rocket motor.

7. The ordnance item of claim 1 wherein said casing defines a warhead.

8. The ordnance item of claim 1 wherein said casing defines pressure activated vents for internal pressure relief.

9. The ordnance item of claim 1 wherein said energetic material has an autoignition temperature which exceeds said predetermined temperature.

10. The ordnance item of claim 9 wherein said second liner has a chemical degradation temperature which exceeds said autoignition temperature.

* * * * *